(12) United States Patent
Inaoka et al.

(10) Patent No.: US 7,578,576 B2
(45) Date of Patent: Aug. 25, 2009

(54) METHOD OF MANUFACTURING ALIGNMENT JIG AND LIQUID-JET HEAD UNIT

(75) Inventors: Yasuo Inaoka, Nagano-ken (JP); Isao Yanagisawa, Nagano-ken (JP); Yoshihiro Igarashi, Nagano-ken (JP); Hiroshige Owaki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 660 days.

(21) Appl. No.: 11/439,261

(22) Filed: May 24, 2006

(65) Prior Publication Data
US 2006/0268063 A1    Nov. 30, 2006

(30) Foreign Application Priority Data
May 24, 2005    (JP)    ............................. 2005-151396

(51) Int. Cl.
*B41J 2/14*    (2006.01)
*B41J 2/16*    (2006.01)
(52) U.S. Cl. .......................................... 347/47; 347/40
(58) Field of Classification Search ............. 347/40–43, 347/47
See application file for complete search history.

(56) References Cited

U.S. PATENT DOCUMENTS 6,471,335 B1 *  10/2002  Gelbart ........................ 347/49

FOREIGN PATENT DOCUMENTS

JP    2002-160376 A    6/2002

\* cited by examiner

*Primary Examiner*—Thinh H Nguyen
(74) *Attorney, Agent, or Firm*—Sughrue Mion, PLLC

(57) ABSTRACT

An alignment jig including a base jig which is used when bonding a nozzle plate provided with nozzle orifices which eject liquid in a liquid-jet head to a fixing member holding a nozzle plate side of a plurality of the liquid-jet heads, and which is provided with a penetrated hole in a thickness direction in a region facing a reference mark to be aligned with an alignment mark provided on the nozzle plate as well as the fixing member is held on one plane of the base jig; and a mask which is provided on the other plane of the base jig and has transparency, and where a protrusion protruding in the penetrated hole is formed with the reference mark provided on an edge plane of the mask.

8 Claims, 8 Drawing Sheets

METHOD OF MANUFACTURING ALIGNMENT JIG AND LIQUID-JET HEAD UNIT

The entire disclosure of Japanese Patent Application No. 2005-151396 filed May 24, 2005 is expressly incorporated by reference herein.

BACKGROUND

1. Technical Field

The present invention relates to a method of manufacturing: an alignment jig used when aligning and bonding a nozzle plate of a plurality of liquid-jet heads, which eject liquid, with a fixing member; and a liquid-jet head unit using the alignment jig.

2. Related Art

An ink-jet recording apparatus such as an ink-jet printer and a plotter is provided with an ink-jet recording head unit (hereinafter, referred to as a head unit) which includes an ink-jet recording head capable of ejecting, as ink droplets, ink held in a liquid holding unit such as an ink cartridge and an ink tank.

The head unit includes: an ink-jet recording head having a nozzle line composed of nozzle orifices provided in parallel lines; and a cover head protecting a plane side which ejects ink droplets of the ink-jet recording head. The cover head has: a window frame portion with an opening window portion which exposes the nozzle orifices and which is provided on the plane side that ejects ink droplets of the ink-jet recording head; and a side wall portion which is formed by being bent from the window frame portion toward a side face of the ink-jet recording head. The cover head is fixed by bonding the side wall part to the side face of the ink-jet recording head (please refer to FIG. 3 on p. 4 of JP-A-2002-160376, for example).

Furthermore, when bonding a fixing member such as the cover head and a fixing board to the plurality of the ink-jet recording heads, the bonding is performed by aligning a plate-shaped mask having a reference mark with an alignment mark provided on a nozzle plate. However, since things such as a base jig holding the nozzle plate exists between the mask and the nozzle plate, there is a problem that a distance between the reference mark and the alignment mark increases, and that the precision of alignment decreases.

In addition, if the distance between the mask and the fixing board is shortened by thinning the base jig which holds the fixing member, a stiffness of the base jig decreases. Thus, when fixing the fixing member to the ink-jet recording head, there is a problem that a deformation and a fracture of the base jig are invited, and that it is not possible to perform alignment with high precision.

Please note that the problem of this kind naturally exists not only in a method of manufacturing the ink-jet recording head unit, but also in a method of manufacturing other liquid-jet head units.

FIG. 3 on p. 4 of JP-A-2002-160376 is an example of related art.

SUMMARY

An advantage of some aspects of the invention is that it provides a method of manufacturing an alignment jig which is capable of improving alignment precision and a liquid-jet head unit.

A first aspect of the invention to solve the above issue is an alignment jig including: a base jig which is used when bonding a nozzle plate provided with nozzle orifices which eject liquid in a liquid-jet head to a fixing member holding a nozzle plate side of a plurality of the liquid-jet heads, and which is provided with a penetrated hole in a thickness direction in a region facing a reference mark to be aligned with an alignment mark provided on the nozzle plate while holding the fixing member on one side; and a mask which is provided on the other side of the base jig and has transparency, and where a protrusion protruding in the penetrated hole is formed with the reference mark provided on an edge plane of the mask.

In the first aspect, it is possible to decrease a distance between the reference mark and the alignment mark of the nozzle plate and to align the mask with the liquid-jet head with high precision, since the protrusion is provided for the mask and the reference mark is provided for the end surface of the protrusion. Moreover, it is possible to maintain a stiffness of the base jig and to prevent a deformation or a fracture of the base jig, since it is possible to decrease the distance between the reference mark and the alignment mark without thinning the base jig.

A second aspect of the invention is the alignment jig according to the first aspect, wherein the protrusion is provided for each reference mark.

In the second aspect, it is possible to maintain the stiffness of the base jig, to prevent the deformation and the fracture of the base jig, and to align the mask with the liquid-jet head with high precision.

A third aspect of the invention is the alignment jig according to the first and second aspects, wherein the protrusion is provided in a manner that the reference mark is in a vicinity of the alignment mark of the nozzle plate.

In the third aspect, it is possible to align the mask with the liquid-jet head with high precision by making the distance between the reference mark and the alignment mark as small as possible.

A fourth aspect of the invention is the alignment jig according to any one of the first to third aspects, wherein the mask is freely attached and detached to/from the base jig, as well as a pressing unit is held by the base jig in a manner that the pressing unit is freely attachable and detachable, the pressing unit pressing the liquid-jet head to the fixing member side.

In the fourth aspect, it is possible to reduce costs by removing the mask to be used for another alignment, when curing an adhesive agent for bonding the fixing member and the liquid-jet head.

A fifth aspect of the invention is the alignment jig according to the fourth aspect, wherein the pressing unit includes: a pressing pin; an energizing unit that energizes the pressing pin to the liquid-jet head side; and a pressing top that presses the liquid-jet head while uniformly propagating a pressing force of the pressing pin over the liquid-jet head.

In the fifth aspect, it is possible to press the liquid-jet head against the fixing member at a uniform pressure within a surface of the nozzle plate, by pressing the liquid-jet head while propagating the pressing force of the pressing pin by use of the pressing top.

A sixth aspect of the invention is the alignment jig according to any one of the first to fifth aspects, wherein a spacer jig is provided on the base jig for holding the fixing member.

In the sixth aspect, it is possible to securely hold the fixing member by use of the spacer jig.

A seventh aspect of the invention is the alignment jig according to the sixth aspect, wherein a suctioning and holding unit that suctions and holds the fixing member is connected to the spacer jig.

In the seventh aspect, it is possible to securely hold the fixing member by use of the spacer jig.

An eighth aspect of the invention is a method of manufacturing the liquid-jet head unit, wherein the fixing member is fixed to the plurality of the liquid-jet heads by use of the alignment jig according to any one of first to seventh aspects.

In the eighth aspects, it is possible to realize the liquid-jet head unit in which a liquid jet characteristic such as a position of ink droplets dropped is improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, detailed descriptions will be given of embodiments of the invention.

First Embodiment

Figure 1:
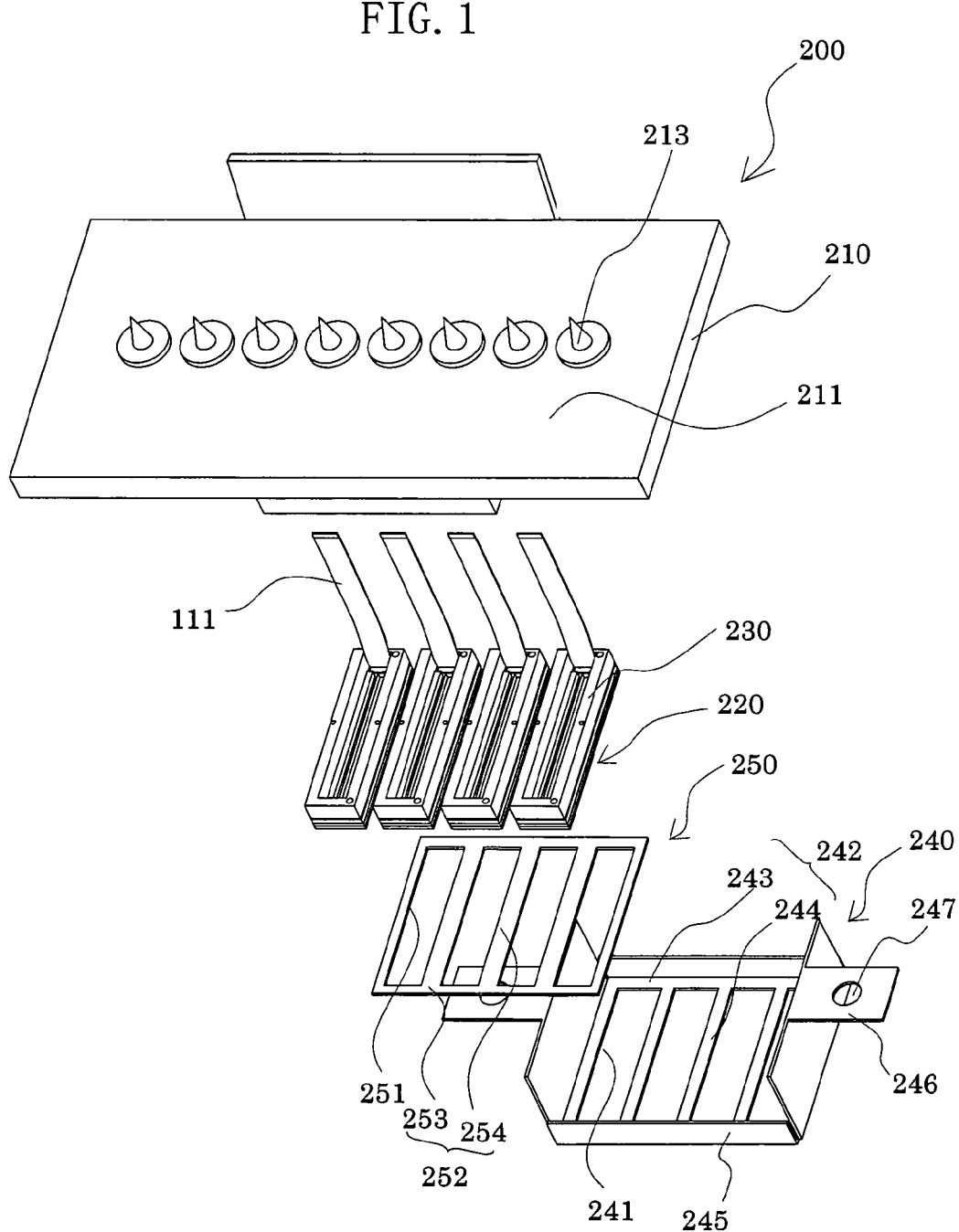
FIG. 1 is an exploded perspective view of a head unit according to a first embodiment.
Figure 2:
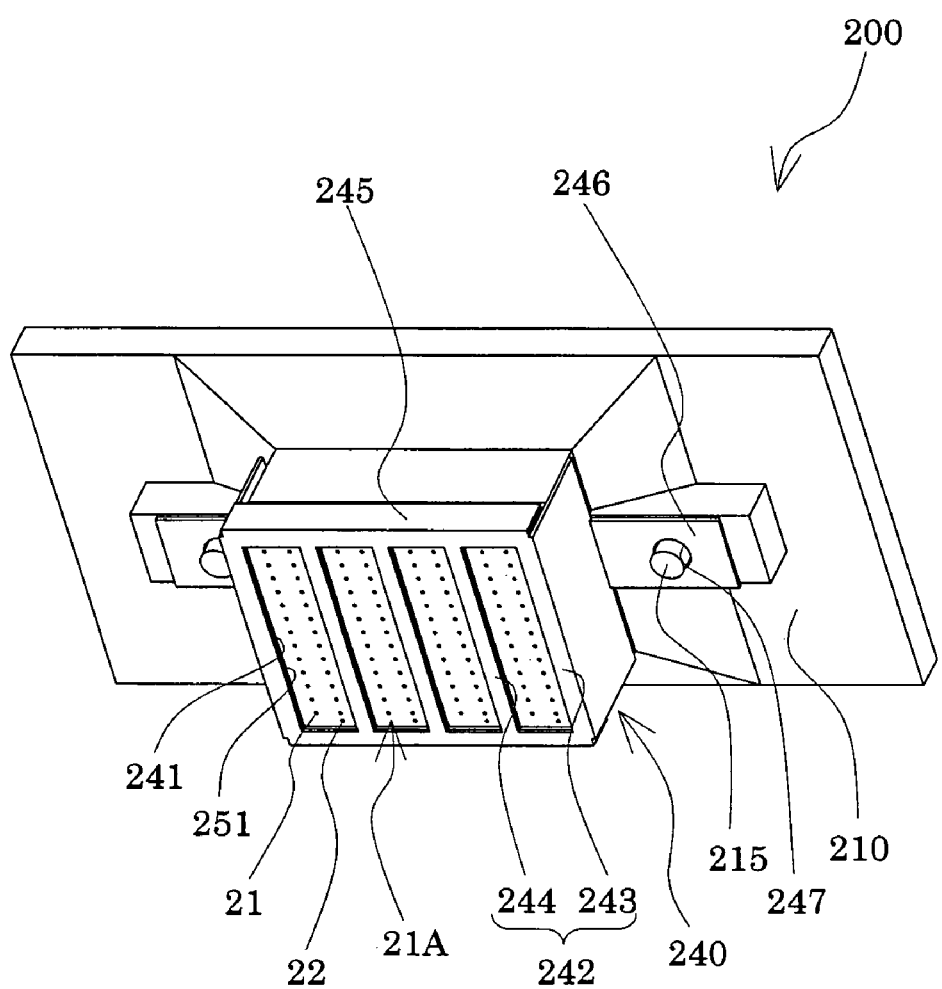
FIG. 2 is an assembly perspective view of the head unit according to the first embodiment.
Figure 3:
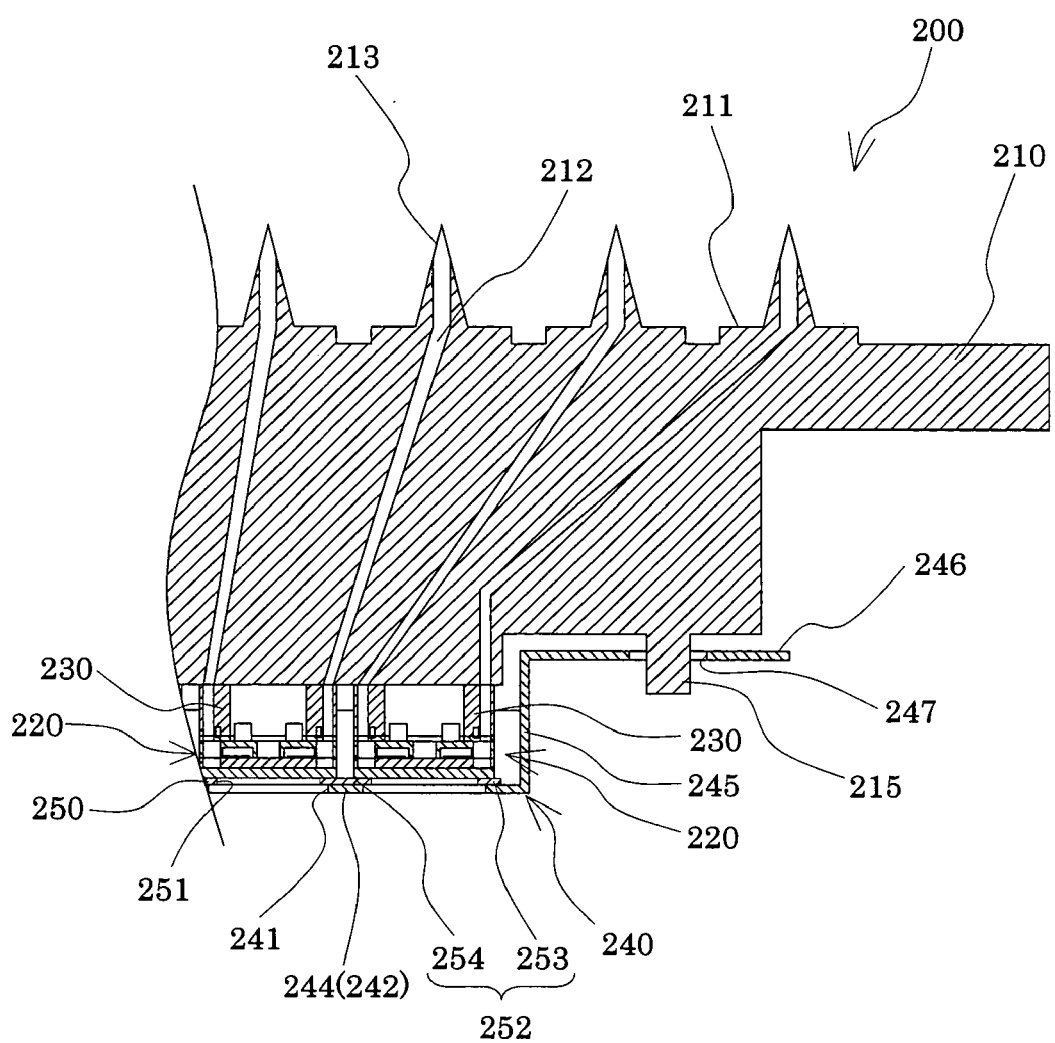
FIG. 3 is a cross-sectional view of a crucial part of the head unit according to the first embodiment.

FIG. 1 is an exploded perspective view of an ink-jet recording head unit according to a first embodiment of the invention, FIG. 2 is an assembly perspective view of the ink-jet recording head unit, and FIG. 3 is a cross-sectional view of its crucial part. As shown in FIG. 1, a cartridge case 210, which is a holding member comprising an ink-jet recording head unit 200 (hereinafter, referred to as the head unit 200), includes a cartridge attachment part 211 to which each ink cartridge (not shown) for supplying ink is attached. For example, in this embodiment, the ink cartridges are comprised of different cartridges in which black ink and three other colors of ink are filled, and the ink cartridges of each color are attached to the cartridge case 210. Moreover, as shown in FIG. 3, on a bottom of the cartridge case 210 a plurality of ink communicating paths 212 are provided whose one ends are opened to each of the cartridge attachment parts 211 and whose other ends are opened to a head case side to be described later. Furthermore, ink supply needles 213, which are inserted in ink supply openings of the ink cartridges, are fixed to opening portions of the ink communicating paths 212 of the cartridge attachment part 211 by filters (not shown) formed in the ink communication paths 212 for removing bubbles and foreign substances in the ink.

In addition, on the bottom of the cartridge case 210, there are a plurality of piezoelectric elements 300 together with a head case 230 to which an ink-jet recording head 220 which ejects ink droplets from nozzle orifices 21 is fixed on an end face of a plane opposite to the cartridge case 210 by a driving force of the piezoelectric elements 300. In the embodiment, the plurality of the ink-jet recording heads 220, which eject each color of ink contained in the ink cartridges, is provided in a manner that the ink-jet recording heads 220 correspond to each color of ink, and a plurality of head cases 230 are also provided independently of each other in a manner that the plurality of the head cases 230 correspond to the respective ink-jet recording heads 220.

Figure 4:
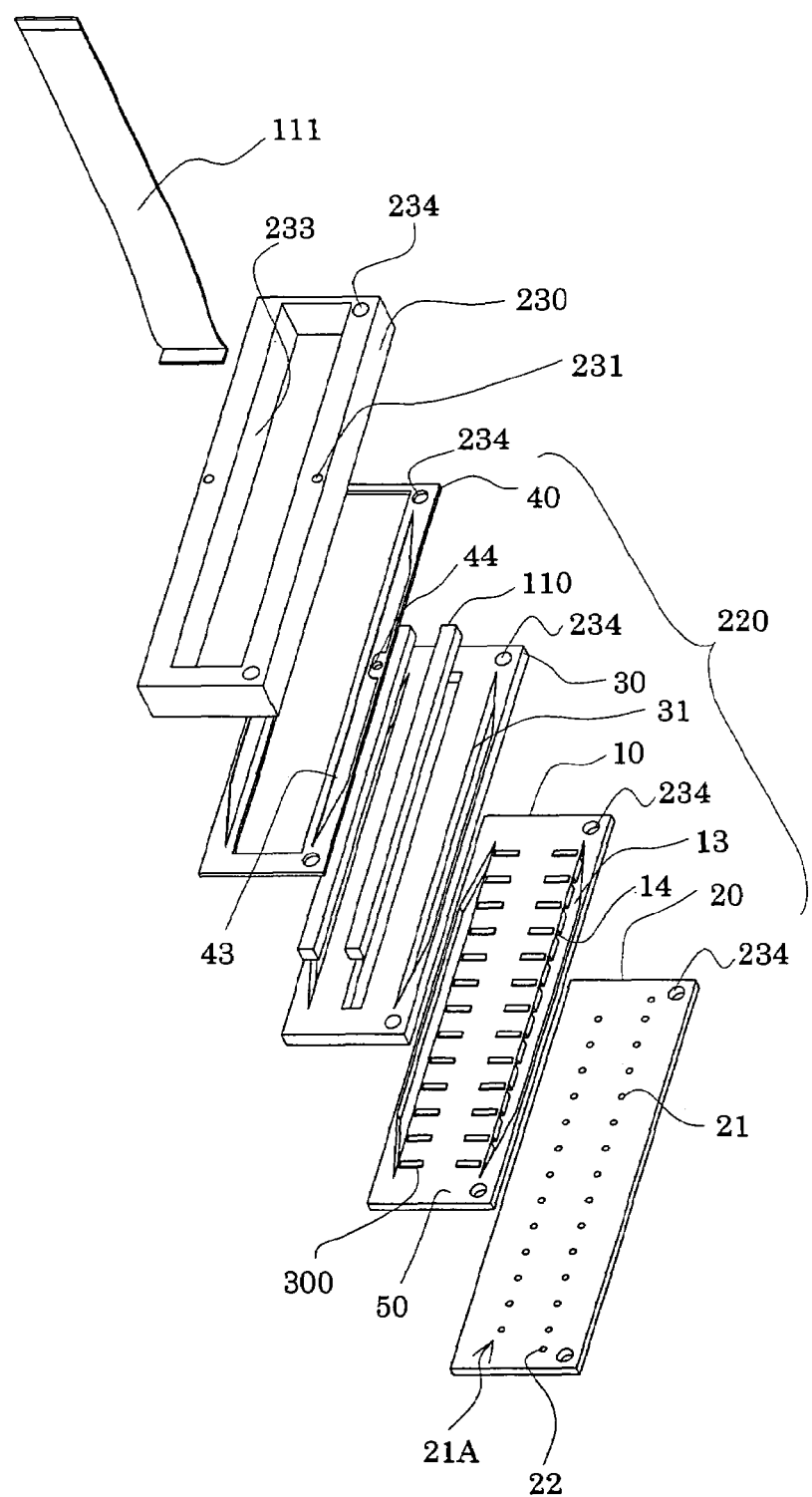
FIG. 4 is an exploded perspective view of the crucial part of the head unit according to the first embodiment.
Figure 5:
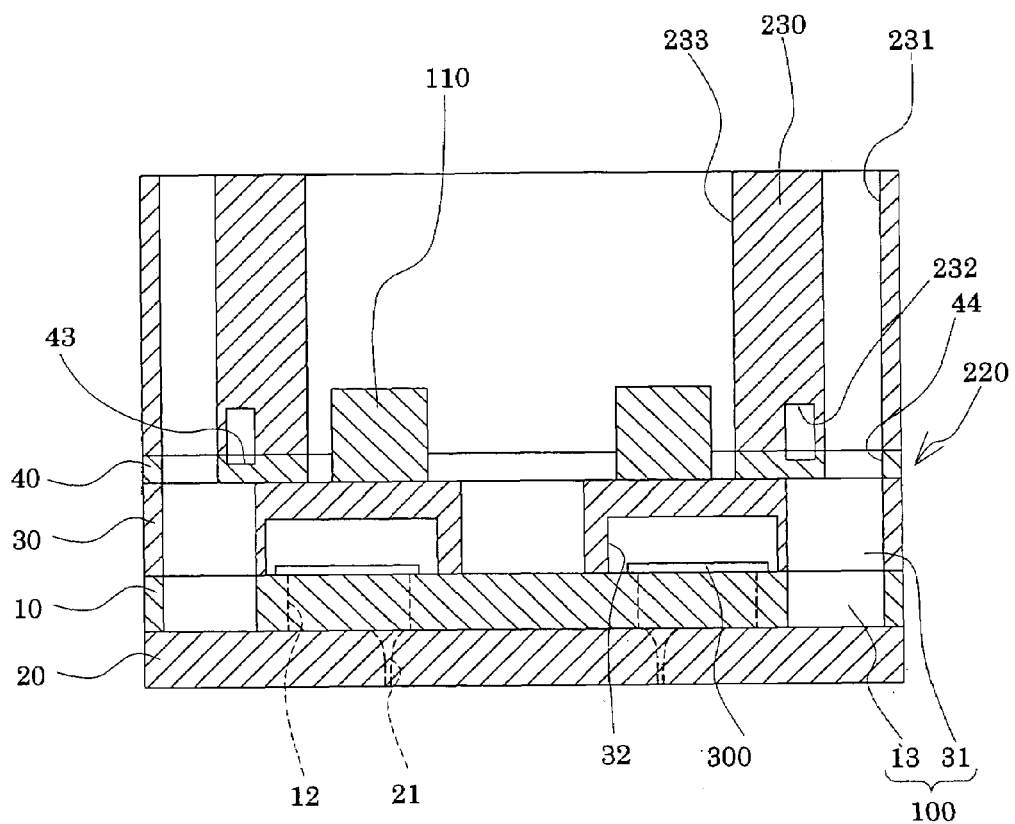
FIG. 5 is a cross-sectional view of a recording head and a head case according to the first embodiment.

Here, descriptions will be given of the ink-jet recording head 220 and the head case 230 of the embodiment, which are mounted on the cartridge case 210. FIG. 4 is an exploded perspective view of the crucial parts of the ink-jet recording head and the head case, and FIG. 5 is a cross-sectional view of the ink-jet recording head and the head case. As shown in FIGS. 4 and 5, a passage-forming substrate 10 comprising the ink-jet recording head 220 is made of a single crystal silicon substrate in the embodiment, and an elastic film 50 made of silicon dioxide, which is previously formed by thermal oxidation, is formed on one plane of the substrate. On the passage-forming substrate 10, pressure generating chambers 12 separated with a plurality of compartment walls are formed in two lines which are provided in parallel in the width direction, by anisotropic etching from the other plane of the substrate. Moreover, in a longitudinal and outer direction of the pressure generating chamber 12 in each line, communicating portions 13 are formed to comprise a reservoir 100 which is to be a common ink chamber of each pressure generating chamber 12, by communicating with a reservoir portion 31 provided on a protective plate 30 which will be described later. In addition, the communication portions 13 are communicated respectively with one end of each pressure generating chamber 12 in the longitudinal direction via the ink supply paths 14.

Furthermore, on the opening portion side of the passage-forming substrate 10, a nozzle plate 20 penetrated by the nozzle orifices 21 which are communicated in a side opposite from the ink supply paths 14 of each pressure generating chamber 12 is firmly attached with an adhesive agent, a thermal welding film and the like. In other words, nozzle lines 21A are provided in two lines together with the nozzle orifices 21 for one ink-jet recording head, in the embodiment. Please note that the nozzle plate 20 is made of glass ceramics, a single crystal silicon substrate, stainless steel or the like, whose thickness is, for example, 0.01 to 1 mm and whose coefficient of linear expansion is, for example, 2.5 to 4.5 ($10^{-6}$/° C.) at 300° C. or less. Moreover, alignment marks 22, which are used when aligning with a fixing plate 250 to be described later, are provided on the nozzle plate 20. In the embodiment, two alignment marks 22 are provided at outer sides of the nozzle orifices 21 in a parallel provision direction.

On the other hand, on the opposite side of the opening portion of the passage-forming substrate 10, the piezoelectric elements 300 are formed on the elastic film 50 by sequentially laminating an insulation film 55 made of zirconium oxide, a lower electrode film made of metal, a piezoelectric layer made of lead zirconate titanate (PZT) and the like, and an upper electrode film made of metal. The protective plate 30, which has a reservoir portion 31 comprising at least a part of the reservoir 100, is bonded to the passage-forming substrate 10 where the piezoelectric elements 300 as described above are formed. In the embodiment, the reservoir portion 31 is formed by extending in the width direction of the pressure generating chamber 12, while penetrating the protective plate 30 in the thickness direction. As described above, the reservoir portion 31 comprises the reservoir 100 to be a common ink chamber of each pressure generating chamber 12 by communicating with the communicating portions 13 of the passage-forming substrate 10.

In addition, a piezoelectric element holding portion 32, which has a space to a degree that the movement of the piezoelectric elements 300 is not inhibited, is provided in a region facing the piezoelectric elements 300 of the protective plate 30. The protective plate 30 of this kind may be made of glass, ceramics, metal, plastic, and the like. However, it is preferable to use a material with a thermal expansion coefficient substantially equal to that of the passage-forming substrate 10. In the embodiment, the protective plate 30 is formed by using a single crystal silicon substrate which is the same material as the passage-forming substrate 10.

Moreover, a drive IC 110 for driving each piezoelectric element 300 is provided on the protective plate 30. Each terminal of the drive IC 110 is connected to a leading wire extending out of a separate electrode of each piezoelectric element 300, through an unillustrated bonding wire or the like. Furthermore, each terminal of the drive IC 110 is connected to the outside through an external wiring 111 such as a flexible print cable (FPC) as shown in FIG. 1, and various signals including a print signal are set to be received from the outside through the external wiring 111.

Additionally, a compliance plate 40 is bonded to the protective plate 30 as described above. An ink introducing port 44 for supplying ink in the reservoir 100 is formed in a region facing the reservoir 100 of the compliance plate 40, by penetrating in a thickness direction. Furthermore, a region except the ink introducing port 44 in the region facing the reservoir 100 of the compliance plate 40 is a flexible portion 43 which is formed to be thin in the thickness direction. The reservoir 100 is sealed by the flexible portion 43. The compliance is given by this flexible portion 43 within the reservoir 100.

In this manner, an ink-jet recording head 220 of the embodiment is composed of four plates, which are the nozzle plate 20, the passage-forming substrate 10, the protective plate 30, and the compliance plate 40. The head case 230 is provided on the compliance plate 40 of the ink-jet recording head 220, the head case 230 being provided with ink supply communicating paths 231 which supply ink from the cartridge case 210 to the ink introducing port 44 by communicating with an ink supply path 212 of the cartridge case 210 as well as communicating with the ink introducing port 44. A concave portion 232 is provided for the head case 230 in a region facing the flexible portion 43 so that the flexible portion 43 may be deformed appropriately. Moreover, the head case 230 is provided with a drive IC holding portion 233, which penetrates in a thickness direction, in a region facing the drive IC 110 provided on the protective plate 30. The external wiring 111 is connected to the drive IC 110 by penetrating the drive IC holding portion 233.

This kind of the ink-jet recording head 220 of the embodiment takes in ink from the ink cartridge, from the ink introducing port 44 through the ink communicating paths 212 and the ink supply communicating paths 231. After filling the insides from the reservoir 100 to the nozzle orifices 21 with ink, the ink-jet recording head 220 follows recording signals from the drive IC 110, and voltage is applied to the piezoelectric elements 300 corresponding respectively to the pressure generating chambers 12. Consequently, the elastic film 50 and the piezoelectric elements 300 are deformed, and thus ink droplets are ejected from the nozzle orifices 21, since the pressure inside each pressure generating chamber 12 is increased.

Pin inserting holes 234 in which pins are inserted to align each member upon assembly are provided in two areas of corners for each member of the ink-jet recording head 220 and the head case 230. Each member is bonded while inserting the pins into the pin inserting holes 234 and performing relative alignment for each member. Thus, the ink-jet recording head 220 and the head case 220 are formed integrally.

Please note that the above-mentioned ink-jet recording head 220 is formed by: concurrently forming many chips on one silicon wafer; bonding the nozzle plate 20 and the compliance plate 40 to form one piece; and thereafter separating the plates by each passage-forming substrate 10 of one chip size as shown in FIG. 4.

The four ink-jet recording heads 220 as described above and head cases 230 are fixed to the above-mentioned cartridge case 210 in given intervals in a parallel direction of the nozzle lines 21A. In other words, the head unit 200 of the embodiment is provided with eight nozzle lines 21A. In this manner, by making a plurality of the nozzle lines 21A by use of the plurality of ink-jet recording heads 220, the nozzle lines 21A being comprised of the nozzle orifices 21 provided parallel, it is possible to prevent yields from decreasing, compared with one ink-jet recording head 220 where many nozzle lines 21A are formed. Furthermore, it is possible to increase the number of ink-jet recording heads 220 formed and obtained from one silicon wafer, by using the plurality of ink-jet recording heads 220 in order to provide many nozzle lines 21A, and it is possible to decrease manufacturing costs by reducing a wasteful area of a silicon wafer.

Moreover, the four ink-jet recording heads 220 as described above are aligned and held by the fixing plate 250 which is a common fixing member bonded to ink droplet ejecting surfaces of the plurality of the ink-jet recording heads 220, as shown in FIGS. 1 and 3. The fixing plate 250 is comprised of a flat plate, and includes: exposed opening portions 251 exposing the nozzle orifices 21; a bonding portion 252 which is bonded to at least both edge portions of the nozzle orifices 21 of the ink droplet ejecting plane of the ink-jet recording head 220 as well as separates the exposed opening portions 251.

The bonding portion 252 is comprised of: a frame portion for fixation 253 provided along the periphery of the ink droplet ejecting surface over the plurality of ink-jet recording heads 220; and a beam for fixation 254 which is provided by extending between the neighboring ink-jet recording heads 220 and which separates the exposed opening portions 251. The bonding portion 252 composed of the frame portion for fixation 253 and the beam for fixation 254 is concurrently bonded to the ink droplet ejecting surfaces of the plurality of the ink-jet recording heads 220. In addition, the frame portion for fixation 253 of the bonding portion 252 is formed in such a manner that it closes the pin inserting holes 234 for aligning each member, upon manufacturing the ink-jet recording heads 220.

As materials of the fixing plate 250 of this kind, for example, metal such as stainless steel, glass ceramics, or single crystal silicon substrate can be cited. Please note that it is preferable to use a material with a thermal expansion coefficient equal to that of the nozzle plate 20, for the fixing plate 250. For example, when the nozzle plate 20 is formed of a single crystal silicon substrate, it is preferable that the fixing plate 250 is formed of a single crystal silicon substrate.

Furthermore, it is preferable that the fixing plate 250 is formed to be thin, and that it is formed to be thinner than a cover head 240 to be described later. This is because, for example, if the fixing plate 250 is made thick, it is difficult to increase the alignment precision since a distance between a reference mark 401 of a mask 410 used when aligning the fixing plate 250 and the alignment mark 22 provided on the nozzle plate 20 of the ink-jet recording head 220 becomes large. An additional reason is that ink is liable to remain in areas such as those between the beams for fixation 254 when wiping the ink droplet ejecting surface of the nozzle plate 20. In other words, if the fixing plate 250 is formed to be thin, it is possible to perform alignment easily and very precisely by decreasing the distance between the alignment mark 22 of the ink-jet recording head 220 and the reference mark of an alignment jig 400 to be described in detail later. It is also possible to prevent ink from remaining on the ink droplet ejecting surface of the nozzle plate 20 upon wiping. Incidentally, the fixing plate 250 is 0.1 mm thick in the embodiment. Moreover, a method of bonding the fixing plate 250 and the nozzle plate 20 is not particularly limited, and, for example, bonding with a thermosetting epoxy adhesive, an ultraviolet curing adhesive or the like can be cited.

In this manner, since the fixing plate 250 blocks areas between the neighboring ink-jet recording heads 220 with the beam for fixation 254, the ink does not enter in the areas between the neighboring ink-jet recording heads 220. Thus, it is possible to prevent a degradation or a fracture of the piezoelectric elements 300 and the drive IC 110 and the like by the ink of the ink-jet recording head 220, the degradation or the fracture being caused by the ink. Additionally, there is no gap between the ink droplet ejecting surface of the ink-jet recording head 220 and the fixing plate 250 since they are bonded with an adhesive agent. Therefore, it is possible to prevent a recorded medium from entering into the gap and to prevent the deformation of the fixing plate 250 and paper jam.

Moreover, the four ink-jet recording heads 220 are aligned and fixed to the fixing plate 250 of this kind. It is possible to perform such alignment of the ink-jet recording head 220 with the fixing plate 250 by using the alignment jig. Here, detailed descriptions will be given of the alignment jig. Please note that FIGS. 6A and 6B are cross-sectional views showing the alignment jig.

Figure 6A:
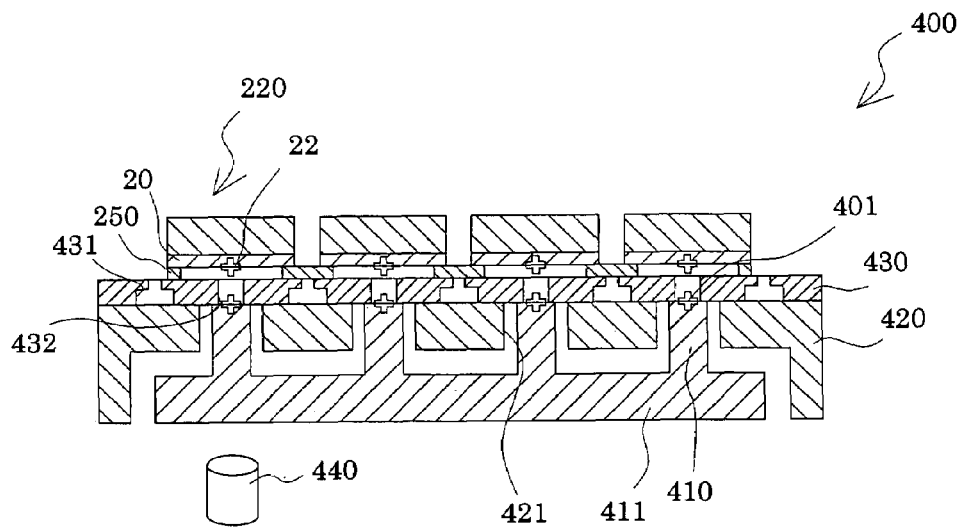
FIGS. 6A and 6B are cross-sectional views of an alignment jig according to the first embodiment.
Figure 6B:
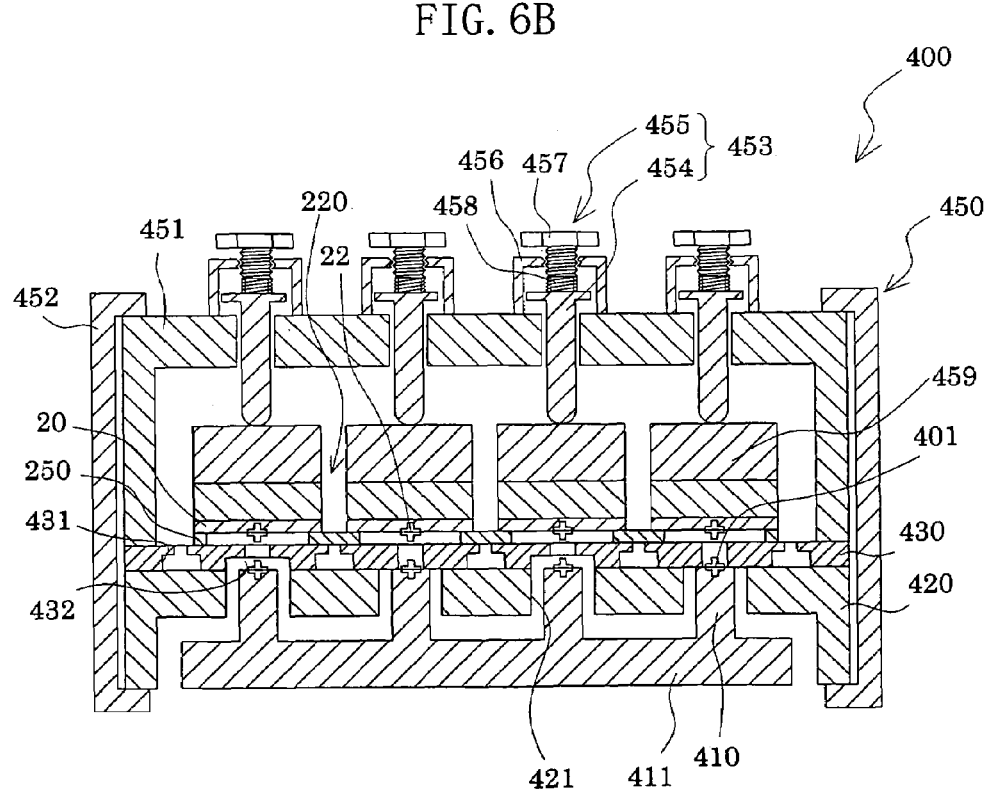

As shown in FIG. 6A, the alignment jig 400 includes: the mask 410 where the reference mark 401 is provided; a base jig 420 provided on the reference mark 401 side of the mask 410; a spacer jig 430 holding the fixing plate 250 which is provided on the base jig 420 and is a fixing member; and an optical system 440 for checking the reference marks 401 of the mask 410 and the alignment marks 22 of the nozzle plates 20, such as a CCD camera and a microscope. The alignment jig 400 is for holding the fixing plate 250 on the spacer jig 430, aligning the reference marks 401 of the mask 410 with the alignment marks 22 provided on the nozzle plates 20 of the ink-jet recording heads 220, and bonding the fixing plate 250 and the nozzle plates 20 of the ink-jet recording heads 220 with an adhesive agent interposed therebetween.

Specifically, the base jig 420 is made of stainless steel or the like, which has a form of a box shape whose bottom is open. In addition, the base jig is provided with a penetrated hole 421 which is a single hole and penetrates in a thickness direction in a region facing the region where the reference marks 401 of the mask 410 are provided. With this penetrated hole 421, it is possible to check the reference marks 401 of the mask 410 and the alignment marks 22 of the nozzle plates 20 by viewing through the mask 410 from the bottom side by use of the optical system 440.

The mask 410 is made of a material having a transparency, for example, glass such as quartz in the embodiment. Moreover, a protrusion 411, which protrudes into the penetrated hole 421 of the base jig 420 where the reference marks 401 are provided on an edge surface, is provided on one plane of the mask 410.

The protrusion 411 has a form of a column shape respectively provided for each reference mark 401 in the embodiment. Since two alignment marks 22 are provided for the nozzle plate 20 of each ink-jet recording head 220 in the embodiment, two reference marks 401 are provided for each ink-jet recording head 220, which means eight reference marks 401 in total.

Furthermore, the protrusion 411 is preferably formed at a height where the reference mark 401 provided on the edge surface is in the vicinity of the alignment mark 22 of the nozzle plate 20. This is for reducing the distance between the alignment mark 22 and the reference mark 401 and improving the alignment precision. In other words, for example, if the reference mark 401 and the alignment mark 22 are far from each other, it is difficult to perform alignment. Thus, it is not possible to improve the alignment precision. Additionally, if the reference mark 401 and the alignment mark 22 are too far from each other, an optical axis of the optical system 440 is largely deviated due to the heat of a metal halide lamp and the like used when checking positions with the optical system 440 such as the CCD camera or the microscope. Thus, a large error occurs in the actual positions of the reference mark 401 and the alignment mark 22.

Incidentally, when the protrusion 411 is not provided for the mask, if the distance between the alignment mark 22 and the reference mark 401 is, for example, approximately 5.1 mm, the deviation of the optical axis becomes approximately 2.5 µm at maximum. In the embodiment, it is possible to reduce the distance between the reference mark 401 and the alignment mark 22 to 110 µm or below, by providing the protrusion 411 for the mask 410. Therefore, it is possible to reduce the deviation of the optical axis of the optical system 440, which is caused by heat as described above, to 0.05 µm or below, thus making it possible to perform alignment with high precision.

Furthermore, if the protrusion 411 is too close to the nozzle plate 20, the adhesive agent bonding the nozzle plate 20 and the fixing plate 250 is attached to the edge surface of the protrusion 411. Hence, there is a possibility of not being able to check the alignment mark 22 and the reference mark 401 with the optical system 440. Accordingly, the edge surface of the protrusion 411 is preferable to be provided in a manner that it is positioned with a given distance from the nozzle plate 20.

In this manner, since the distance between the alignment mark 22 and the reference mark 401 is shortened by providing the protrusion 411 for the mask 410, there is no need to reduce the distance between the reference mark 401 and the alignment mark 22 by thinning the base jig 420. In other words, if the base jig 420 is made thin in order to reduce the distance between the alignment mark 22 and the reference mark 401, when the ink-jet recording head 220 is pressed against the fixing plate 250, an error occurs in the alignment of the reference mark 401 and the alignment mark 22 due to the deformation or the fracture of the base jig 420. Since the protrusion 411 is provided for the mask 410 in the embodiment, there is no need to form the base jig 420 to be thin and it is possible to prevent the deformation or the fracture of the base jig 420 by maintaining its stiffness, thus making it possible to perform alignment with high precision.

Please note that the mask 410 in the embodiment is held in a manner that it is freely attached to and detached from the base jig 420, and is made possible to be used with another alignment jig on occasions such as curing and bonding the fixing plate 250 to the ink-jet recording head 220. Due to this, it is possible to reduce the cost of the alignment jig 420.

The spacer jig 430 is for holding the fixing plate 250 while being held on a plane opposite to the mask 410 of the base jig 420. Specifically, the spacer jig 430 is formed of a plate-shaped member such as stainless steel, and is provided, in its inside, with a plurality of suction chambers 431 to which a suction unit not illustrated here such as suction pumps is connected. The suction chamber 431 is open to the surface of the spacer jig 430, and suctions and maintains the surface of the fixing plate 250. In addition, the spacer jig 430 is provided with a communicating hole 432 which communicates with the penetrated hole 421 of the base jig 420, thus the optical system 440 is capable of checking, from the bottom of the mask 410, the alignment mark 22 of the ink-jet recording head 220, which is suctioned and maintained by the fixing plate 250, due to the communicating hole 432.

Moreover, as shown in FIG. 6B, the alignment jig 400 is provided with a pressing unit 450 pressing the ink-jet recording head 220 against the fixing plate 250 side, the pressing unit 450 being freely attachable and detachable. Specifically, the pressing unit 450 includes: a U-shaped arm portion 451 arranged on the ink-jet recording head 220, both edges of which are mounted on the base jig 420; a clipping portion 452 which holds the arm portion 451 in a manner that it is freely attached to and detached from the base jig 420 by clipping the arm portion 451 and the base jig 420; and a pressing portion 453 which is provided for the arm portion 451 and presses each ink-jet recording head 220 against the fixing plate 250 side.

The pressing portion 453 is provided respectively in a region facing each ink-jet recording head 220 of the arm portion 451. Since four ink-jet recording heads 220 are fixed to one fixing plate 250 in the embodiment, four pressing portions 453 are provided in the same number of the ink-jet recording heads 220.

The pressing portion 453 is comprised of: a pressing pin 454 having a column shape which is inserted into the arm portion 451 and which is provided in a manner that it is freely movable in an axis direction; an energizing unit 455 provided on the base portion of the pressing pin 454 for energizing the pressing pin 454 toward the ink-jet recording head 220 side; and a pressing top 459 arranged between the pressing pin 454 and the ink-jet recording head 220.

The end of the pressing pin 454 is formed in a dome shape and is to press the pressing top 459 by making a point contact on the pressing top 459.

The energizing unit 455 is provided for the arm portion 451 to energize the pressing pin 454 to the ink-jet recording head 220. In the embodiment, the energizing unit 455 includes: a screw holding portion 456 provided in a manner that it surrounds the base side of the pressing pin 454; a screw portion 457 spirally fitted to the screw holding portion 456; and a energizing spring 458 provided between the end surface of the screw portion 457 and the base portion of the pressing pin 454.

The energizing unit 455 of this kind is capable of adjusting the pressing pressure with which the energizing spring 458 presses the pressing pin 454 by the amount of tightening against the screw holding portion 456 of the screw portion 457. Due to this, it is possible to respectively adjust the pressing pressures with which the pressing pins 454 press the pressing tops 459.

The clipping portion 452 is for holding the pressing unit 450 in a manner that the pressing unit 450 is freely attached and detached to/from the base jig 420, by clipping the arm portion 451 and the base jig 420. It is possible to excellently perform arrangement and alignment of the ink-jet recording head 220, by making the pressing unit 450 freely attachable to and detachable from the base jig 420 in this manner.

The pressing top 459 is arranged between the pressing pin 454 and the protective plate 30 of the ink-jet recording head 220, and the pressing pin 454 makes a point contact on the upper surface of the pressing top 459. The pressing top 459 is capable of pressing the ink-jet recording head 220 in a state where the pressing pressure of the pressing pin 454 is uniformly propagated almost all over the protective plate 30 of the ink-jet recording head 220. The whole part of the ink-jet recording head 220 is pressed by the pressing top 459 in a way better than when the end of the pressing pin 454 is directly made to come into contact with the protective plate 30 of the ink-jet recording head 220. Thus, it is possible to securely fix the ink-jet recording head 220 to the fixing plate 250. Please note that the pressing top 459 has a form whose periphery is as large as, or a little smaller than that of the protective plate 30 of the ink-jet recording head 220.

In addition, since the clipping portion 452 is for clipping the base jig 420 and the arm portion 451, it is possible to remove the mask 410 from the base jig 420. For this reason, until the adhesive agent which bonds the ink-jet recording head 220 and the fixing plate 250 is cured, there is no need to use the mask 410. Consequently, it is possible to use the mask 410 as an alignment jig to assemble the next head unit. Thus, it is possible to reduce costs of the alignment jig.

Here, descriptions will be given of a method of manufacturing the head unit which uses the alignment jig 400 of this kind. Incidentally, FIGS. 7A to 7C are plan views showing manufacturing processes of the head unit from the bottom side of the mask.

Figure 7A:
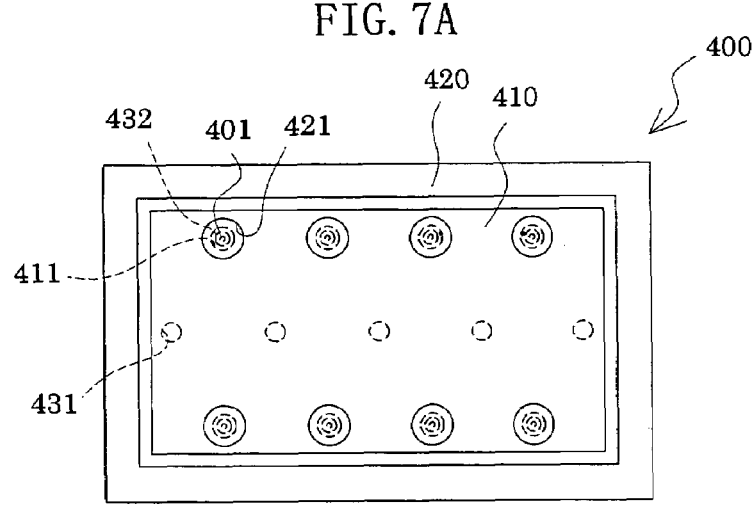
FIGS. 7A to 7C are plan views showing manufacturing processes of the head unit according to the first embodiment.

As shown in FIG. 7A, the reference marks 401 are checked with the optical system 440 from the bottom side of the alignment jig 400.

Figure 7B:
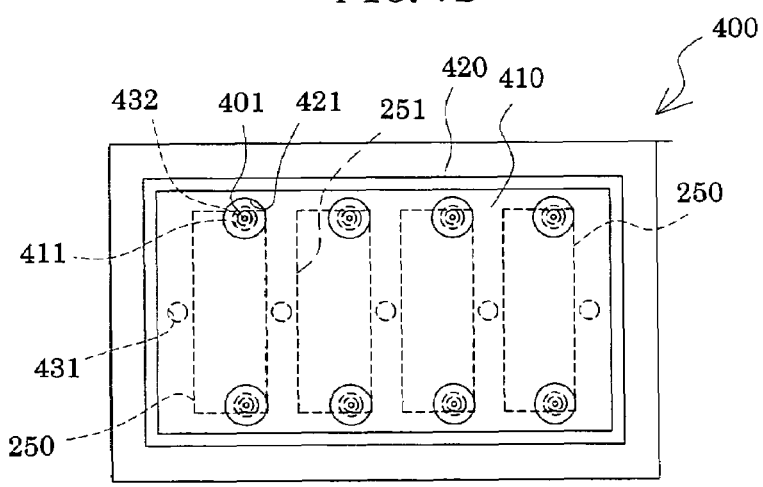
Figure 7C:
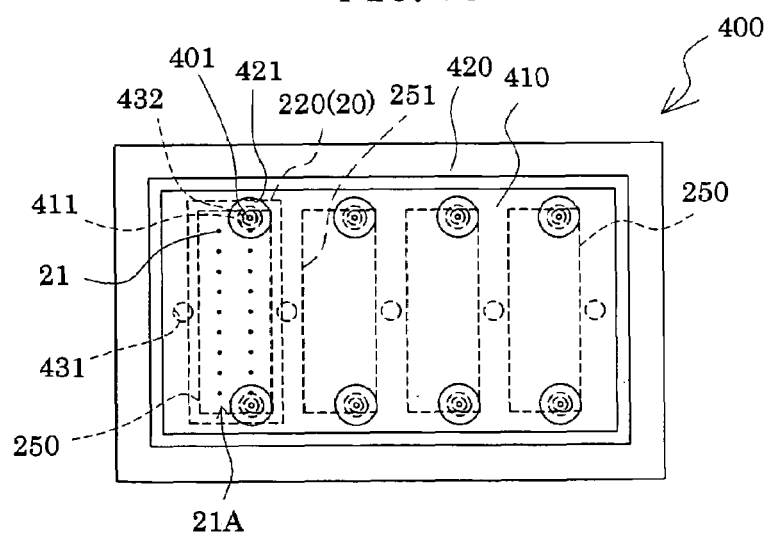

Next, as shown in FIG. 7B, the fixing plate 250 is held by the alignment jig 400. Specifically, the spacer jig 430 of the alignment jig 400 holds the fixing plate 250. At this point, the spacer jig 430 suctions and holds the fixing plate 250 by the suction chamber 431 as described above Then, as shown in FIG. 7C, the ink-jet recording head 220 and the fixing plate 250 are made to come into contact with each other with the adhesive agent interposed therebetween. Specifically, while the positions of the reference mark 401 of the mask 410 and the alignment mark 22 provided on the nozzle plate 20 of the ink-jet recording head 220 are checked from a surface of the mask 410 opposite to the surface where the fixing plate 250 is fixed by use of the optical system 440 such as the microscope or the CCD camera, thus performing alignment, the ink-jet recording head 220 is made to come into contact with the fixing plate 250 with the adhesive agent interposed therebetween. In other words, since the fixing plate 250 is aligned with the alignment jig 400 and is held, it is possible for the fixing plate 250 to be aligned with the ink-jet recording head 220, by aligning the mask 410 with the ink-jet recording head 220.

Incidentally, it is possible to align the ink-jet recording head 220 with the fixing plate 250, for example, by making slight adjustments by use of an unillustrated micrometer or the like. Naturally, the reference mark 401 and the alignment mark 22 may be aligned automatically by driving the micrometer with a drive motor or the like, by processing images taken by the optical system 440 by use of the CCD camera as the optical system 440.

Since the protrusion 411 is provided for the mask 410 in this kind of alignment of the mask 410 and the ink-jet recording head 220, it is possible to reduce the distance between the reference mark 401 of the mask 410 and the alignment mark 22 of the ink-jet recording head 220. Therefore, it is possible to easily perform alignment with high precision in a short time.

Moreover, for example, if the ink-jet recording head 220 is fixed directly to the cover head 240, it is impossible to form the cover head 240 with a thin material since the ink-jet recording head 220 should be protected from impacts such as capping or wiping. Hence, the reference mark 401 of the mask 410 becomes far from the alignment mark 22 of the nozzle plate 20 of the ink-jet recording head 220. In the embodiment, since the ink-jet recording head 220 is not bonded directly to the cover head 240, but is bonded to the fixing plate 250, it is possible to form the fixing plate 250 to be thin. Consequently, it is possible to reduce the distance between the reference mark 401 and the alignment mark 22, and to easily perform alignment of the fixing plate 250 and the ink-jet recording head 220 with high precision.

Thereafter, the plurality of the ink-jet recording heads 220 are sequentially aligned with the fixing plate 250, by repeating the processes shown in FIG. 7C. The adhesive agent is cured while the plurality of the ink-jet recording heads 220 are then pressed against the fixing plate 250 at a predetermined pressure by the above-mentioned pressing unit 450 shown in FIG. 6B. Thereby, it is possible to bond the ink-jet recording heads 220 and the fixing plate 250.

It is possible to align the fixing plate 250 with the nozzle lines 21A with high precision, by aligning and bonding the fixing plate 250 with the plurality of the ink-jet recording heads 220 in this manner. Furthermore, it is possible to perform relative alignment of each nozzle line 21A of the neighboring ink-jet recording heads 220 with high precision. Moreover, the plurality of the ink-jet recording heads 220 are aligned relatively in a direction of ejecting ink droplets, only by bonding the ink-jet recording heads 220 to the fixing plate 250, since the ink-jet recording heads 220 are bonded by coming into contact with the fixing plate 250 formed of a flat plate. For this reason, there is no need to perform alignment of the plurality of the ink-jet recording heads 220 in the direction of ejecting ink droplets, thus making it possible to securely avoid errors in positions of the ink droplets dropped.

On the other hand, as shown in FIGS. 1 and 2, the cover head 240 having a box shape is provided for the head unit 200 on the opposite side of the ink-jet recording heads 220 of the fixing plate 250, in a manner that it covers the plurality of the ink-jet recording heads 220. The cover head 240 includes: a fixing portion 242 which is provided with the opening portions 241 in a manner that the opening portions 241 correspond to the exposed opening portion 251 of the fixing plate 250; and a side wall portion 245 which is provided on a side face of the ink droplet ejecting plane of the ink-jet recording head 220, in such a manner that it bends along the periphery of the fixing plate 250.

A fixing portion 242 is comprised of: a frame portion 243 which is provided corresponding to the frame portion for fixation 253 of the fixing plate 250; and a beam portion 244 which is provided, corresponding to the beam portion for fixation 254 of the fixing plate 250 and which separates opening portions 241. In addition, the fixing portion 242 comprised of this kind of the frame portions 243 and the beam portion 244 is bonded to the bonding portion 252 of the fixing plate 250.

Since the ink droplet ejecting surface of the ink-jet recording head 220 is bonded to the cover head 240 without gaps in this manner, it is possible to prevent a recorded medium from entering into the gaps and to prevent the deformation of the cover head 240 and the paper jam. Furthermore, it is possible to securely prevent ink from going around to the side of the ink-jet recording head 220, by causing a side wall portion 245 of the cover head 240 to cover the peripheral edges of the plurality of the ink-jet recording heads 220.

As the cover head 240 of this kind, for example, metal material such as stainless steel can be cited. A metal plate may be formed by press working or by molding. Moreover, it is possible to ground it by using a conductive metal material for the cover head 240. Furthermore, the cover head 240 requires strength to a certain extent in order to protect the ink-jet recording head 220 from impacts such as wiping or capping. Therefore, the cover head 240 is required to be relatively thick. Please note that the thickness of the cover head 240 is 0.2 mm in the embodiment.

Incidentally, the bonding of the cover head 240 and the fixing plate 250 is not particularly limited. For example, the bonding with a thermosetting epoxy adhesive can be cited.

Furthermore, the fixing portion 242 is provided with a flange portion 246 where a fixing hole 247 is provided for aligning and fixing the cover head 240 with other members. The flange portion 246 is provided by being bent in a manner that it is protruded from the side wall portion 245 in the same direction as a plane direction of the ink droplet ejecting surface. As shown in FIGS. 2 and 3, the cover head 240 is fixed to the cartridge case 210 which is a holding member holding the ink-jet recording head 220 and the head case 230 in the embodiment.

Specifically, as shown in FIGS. 2 and 3, the cartridge case 210 is provided with a protrusion 215 which protrudes to the ink droplet ejecting surface side and which is inserted in the fixing hole 247 of the cover head 240. The cover head 240 is fixed to the cartridge case 210, by heating and crimping the end of the protrusion 215 as well as inserting this protrusion 215 in the fixing hole 247 of the cover head 240. It is possible to align the cover head 240 in the plane direction of the ink droplet ejecting surface to fix the cover head 240 to the cartridge case 210, by setting this kind of the protrusion 215 provided for the cartridge case 210 to have an external diameter smaller than the fixing hole 247 of the flange portion 246.

In addition, the cover head 240 of this kind and the fixing plate 250 where the plurality of the ink-jet recording heads 220 are bonded are fixed by aligning the fixing hole 247 of the cover head 240 with the plurality of nozzle lines 21A. Here, although it is possible to align the fixing hole 247 of the cover head 240 with the plurality of the nozzle lines 21A by use of the above-described alignment jig 400, the cover head 240 is simultaneously aligned and fixed when the fixing plate 250 is aligned with and fixed to the plurality of the ink-jet recording heads 220.

Figure 8:
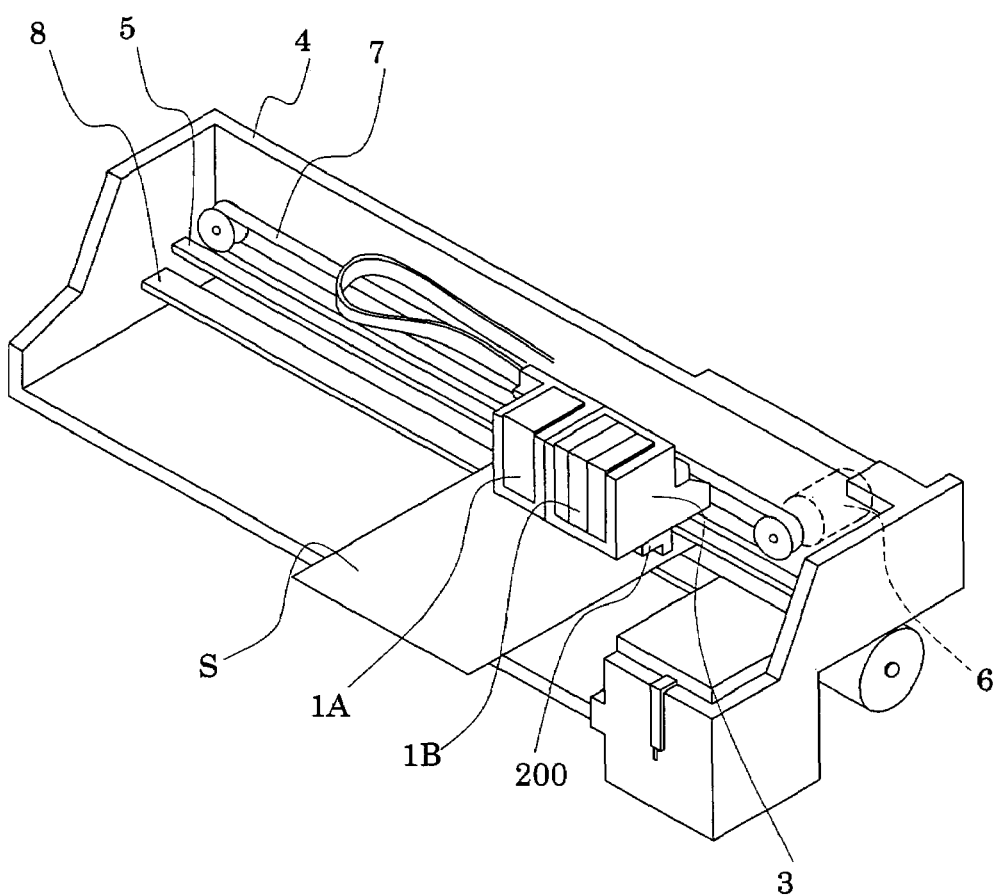
FIG. 8 is a schematic diagram of an ink-jet recording apparatus according to the first embodiment.

The head unit 200 of this kind is mounted on an ink-jet recording apparatus. FIG. 8 is a schematic diagram showing an example of the ink-jet recording apparatus. As shown in FIG. 8, the head unit 200 having the ink-jet recording head is provided in a manner such that cartridges 1A and 1B comprising ink supply units are freely attached and detached. A carriage 3 where the head unit 200 is mounted is provided for a carriage shaft 5 attached to a device main body 4, in a manner such that the carriage 3 is freely movable in an axis direction. Each ink-jet recording head of the head unit 200 ejects, for example, black ink compositions and color ink compositions.

Furthermore, the carriage 3 mounting the head unit 200 moves along the carriage shaft 5, by conveying a driving force of a drive motor 6 via a plurality of unillustrated gears and a timing belt 7. On the other hand, the device main body 4 is provided with a platen 8 along the carriage shaft 5. A recording sheet S, which is a recording medium such as a paper fed by an unillustrated feed roller, is transferred on the platen 8.

Other Embodiments

As described above, the descriptions were given of the embodiment of the invention. However, the invention is not limited to the above. For example, a water-repellent film for improving water repellency is actually formed on the ink droplet ejecting surface of the nozzle plate 20 of the above-mentioned first embodiment. The water-repellent film is not particularly limited, but a metal film, for example, can be cited. The metal film of this kind decreases adhesion, when bonding the fixing plate 250 to the ink droplet ejecting surface. Therefore, it is preferable to provide the metal film only for a region exposed by the exposed opening portion 251 of the fixing plate 250. Moreover, it is possible to very precisely form the metal film of this kind with a predetermined thickness by, for example, eutectoid plating.

In addition, although eight column-shaped protrusions 411 are provided for the mask 410 in the above-mentioned first embodiment, the number is not particularly limited to this. For example, the number of protrusion 411 may be one for each ink-jet recording head 220. In this case, it is sufficient if the penetrated hole 421 of the base jig 420 is provided in the same shape as the protrusion. The stiffness of the base jig is not reduced by the penetrated hole even with a penetrated hole of this kind.

Furthermore, although the alignment jig 400 is provided with the pressing unit 450 in the above-described first embodiment, it is not particularly limited to this. For example, when using the ultraviolet curing adhesive as the adhesive agent for bonding the fixing plate 250 and the ink-jet recording head 220, it is possible to bond the fixing plate 250 and the ink-jet recording head 220 by irradiating ultraviolet rays in a state where the fixing plate 250 is made to come into contact with the ink-jet recording head 220 and by curing the adhesive agent, after applying the adhesive agent to a bonding surface of the fixing plate 250. Hence, the pressing unit 450 may not be provided. Please note that, unlike a thermosetting adhesive, the ultraviolet curing adhesive is not required to be cured while pressurizing the fixing plate 250 and the ink-jet recording head 220 at a predetermined pressure. It is possible to avoid a departure of the positions between the ink-jet recording head 220 and the fixing plate 250 and to bond the ink-jet recording head 220 and the fixing plate 250 with high precision, due to pressurization. Additionally, in the bonding by use of the ultraviolet curing adhesive, the bonding strength is relatively weak. In this case, it is sufficient if surroundings such as a corner, which is formed by the ink-jet recording head 220 and the fixing plate 250, is fixed with a thermosetting adhesive, after bonding the fixing plate 250 to the ink-jet recording head 220 with the ultraviolet curing adhesive. For this reason, it is possible to improve reliability by very precisely and firmly bonding the fixing plate 250 to the ink-jet recording head 220.

Furthermore, in the above-mentioned first embodiment, the fixing plate 250 formed of a flat plate is exemplified as a fixing member for bonding the plurality of the ink-jet recording heads 220. However, the fixing member is not limited to the fixing plate 250. For example, the plurality of the ink-jet recording heads 220 may be aligned with and bonded directly to the cover head 240. Even in this case, it is possible to perform alignment with high precision by use of the above-mentioned alignment jig 400, thus performing the bonding.

Moreover, in the above-mentioned first embodiment, the ink-jet recording head 220 of a flexible vibration type is exemplified. However, the ink-jet recording head 220 is not limited to this. It is natural that the ink-jet recording head 220 may be applied to head units having ink-jet recording heads with various structures, such as an ink-jet recording head of a vertical vibration type where a piezoelectric material and an electrode forming material are sequentially laminated and are expanded in an axis direction, and an ink-jet recording head which ejects ink droplets by use of bubbles caused by heat generated due to an exothermic element and the like.

Please note that the head unit and the ink-jet recording apparatus, which have the ink-jet recording head as a liquid-jet head to eject ink, are exemplified. However, the invention widely targets all methods of manufacturing liquid-jet head units which have the liquid-jet head. For example, a recording head used for an image recording device such as a printer, a color material jet head used for manufacturing a color filter such as a liquid crystal display, an electrode material jet head used for forming an electrode such as an organic EL display and a field emission display (FED), and a bioorganic jet head used for manufacturing a bio chip can be cited as the liquid-jet heads.

What is claimed is:

1. An alignment jig comprising:
    a base jig which is used when bonding a nozzle plate provided with nozzle orifices which eject liquid in a liquid-jet head to a fixing member holding a nozzle plate side of a plurality of the liquid-jet heads, and which is provided with a penetrated hole in a thickness direction in a region facing a reference mark to be aligned with an alignment mark provided on the nozzle plate as well as the fixing member is held on one plane of the base jig; and
    a mask which is provided on the other plane of the base jig and has transparency, and where a protrusion protruding in the penetrated hole is formed with the reference mark provided on an edge plane of the mask.

2. The alignment jig according to claim 1, wherein the protrusion is provided for each reference mark.

3. The alignment jig according to claim 1, wherein the protrusion is provided in a manner that the reference mark is in a vicinity of the alignment mark of the nozzle plate.

4. The alignment jig according to claim 1, wherein the mask is freely attached and detached to/from the base jig, as well as a pressing unit is held by the base jig in a manner that the pressing unit is freely attachable and detachable, the pressing unit pressing the liquid-jet head to the fixing member side.

5. The alignment jig according to claim 4, wherein the pressing unit includes:
    a pressing pin;
    an energizing unit energizing the pressing pin toward a liquid-jet head side; and
    a pressing top pressing the liquid-jet head while uniformly propagating a pressing force of the pressing pin over the liquid-jet head.

6. The alignment jig according to claim 1, wherein a spacer jig is provided on the base jig for holding the fixing member.

7. The alignment jig according to claim 6, wherein a suctioning and holding unit that suctions and holds the fixing member is connected to the spacer jig.

8. A method of manufacturing a liquid-jet head unit, wherein the fixing member is fixed to the plurality of the liquid-jet heads by use of the alignment jig according to claim 1.

* * * * *